United States Patent
Jepsen et al.

(10) Patent No.: US 9,368,070 B2
(45) Date of Patent: Jun. 14, 2016

(54) VARIABLE RESOLUTION SEAMLESS TILEABLE DISPLAY

(71) Applicant: Google Inc., Mountain View, CA (US)

(72) Inventors: Mary Lou Jepsen, Sausalito, CA (US); Behnam Bastani, San Jose, CA (US)

(73) Assignee: Google Inc., Mountain View, CA (US)

( * ) Notice: Subject to any disclaimer, the term of this patent is extended or adjusted under 35 U.S.C. 154(b) by 305 days.

(21) Appl. No.: 14/047,741

(22) Filed: Oct. 7, 2013

(65) Prior Publication Data

US 2015/0097837 A1 Apr. 9, 2015

(51) Int. Cl.
*G09G 3/34* (2006.01)
*G06F 3/14* (2006.01)

(52) U.S. Cl.
CPC ............ *G09G 3/3406* (2013.01); *G06F 3/1446* (2013.01); *G09G 2300/023* (2013.01); *G09G 2300/0426* (2013.01); *G09G 2340/14* (2013.01)

(58) Field of Classification Search
CPC ... G02F 1/13336; G06F 3/1446; G03B 21/13; H01L 27/3293
See application file for complete search history.

(56) References Cited

U.S. PATENT DOCUMENTS

| | | | |
|---|---|---|---|
| 6,377,306 B1 | 4/2002 | Johnson et al. | |
| 7,145,611 B2 | 12/2006 | Dubin et al. | |
| 7,339,625 B2 | 3/2008 | Matthys et al. | |
| 7,495,638 B2 | 2/2009 | Lamvik et al. | |
| 7,744,289 B2 | 6/2010 | Hu | |
| 8,305,294 B2 | 11/2012 | Cok et al. | |
| 9,123,266 B2 | 9/2015 | Bastani et al. | |
| 2002/0080302 A1 | 6/2002 | Dubin et al. | |
| 2003/0117545 A1* | 6/2003 | Coker ................. | G02F 1/13336 349/61 |
| 2006/0012733 A1 | 1/2006 | Jin et al. | |
| 2010/0177261 A1 | 7/2010 | Jin et al. | |
| 2013/0093646 A1 | 4/2013 | Curtis et al. | |
| 2015/0022727 A1 | 1/2015 | Jepsen | |
| 2015/0022754 A1 | 1/2015 | Jepsen et al. | |

(Continued)

FOREIGN PATENT DOCUMENTS

| | | |
|---|---|---|
| JP | 2004-251981 | 9/2004 |
| JP | 2005-017738 | 1/2005 |

OTHER PUBLICATIONS

PCT/US2014/056814, PCT International Search Report and Written Opinion, mailed Dec. 12, 2014 (7 pages).

(Continued)

*Primary Examiner* — Gregory J Tryder
*Assistant Examiner* — Scott E Sonners
(74) *Attorney, Agent, or Firm* — Blakely Sokoloff Taylor & Zafman LLP

(57) ABSTRACT

A tileable display panel includes an illumination layer, a display layer, and a screen layer. The display layer is disposed between the screen layer and the lamp layer and includes pixelets separated from each other by spacing regions. Each of the pixelets is positioned to be illuminated by lamp light from the illumination layer and to project a magnified image sub-portion onto the backside of the screen layer such that the magnified image sub-portions collectively blend together to form a unified image on the screen layer which covers the spacing regions on the display layer. Each of the pixelets includes core pixels having a common size and a first separation pitch and peripheral pixels surrounding the core pixels on two or more sides which provide a higher image resolution in overlap regions on the screen layer when the magnified image sub-portions overlap on the screen layer.

20 Claims, 7 Drawing Sheets

(56) References Cited

U.S. PATENT DOCUMENTS

2015/0023051 A1   1/2015   Jepsen et al.
2015/0097853 A1   4/2015   Bastani et al.
2015/0153023 A1   6/2015   Jepsen et al.

OTHER PUBLICATIONS

PCT/US2014/056814, PCT International Preliminary Report on Patentability, mailed Apr. 21, 2016 (6 pages).

TW 103134790—First Office Action with English Translation, mailed Mar. 25, 2016, 6 pages.

* cited by examiner

VARIABLE RESOLUTION SEAMLESS TILEABLE DISPLAY

TECHNICAL FIELD

This disclosure relates generally to optical displays, and in particular but not exclusively, relates to seamless tiling of optical displays.

BACKGROUND INFORMATION

Large wall displays can be prohibitively expensive as the cost to manufacture display panels rises exponentially with monolithic display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

FIGS. 1A and 1B illustrate how tiling multiple smaller, less expensive display panels 100 together can achieve a large multi-panel display 105, which may be used as a large wall display. The individual images displayed by each display panel 100 may constitute a sub-portion of the larger overall composite image collectively displayed by multi-panel display 105. While multi-panel display 105 can reduce costs, visually it has a major drawback. Each display panel 100, includes a bezel 110 around its periphery. Bezel 110 is a mechanical structure that houses pixel region 115 in which the display pixels are disposed. In recent years, manufactures have reduced the thickness of bezel 110 considerably to less than 2 mm. However, even these thin bezel trims are still very noticeable to the naked eye, distract the viewer, and otherwise detract from the overall visual experience.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and techniques for a seamless tileable display panel are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
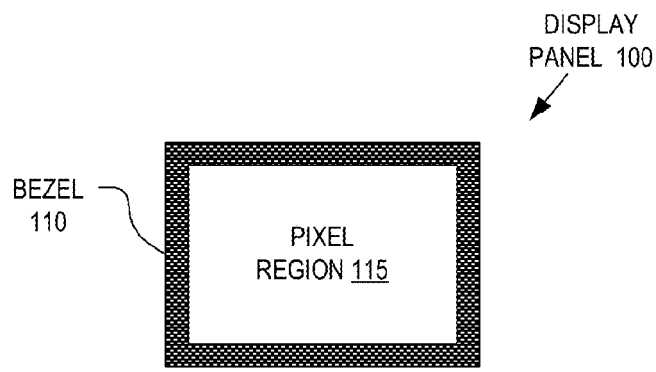
FIGS. 1A & 1B illustrate conventional display panel tiling.
Figure 1B:
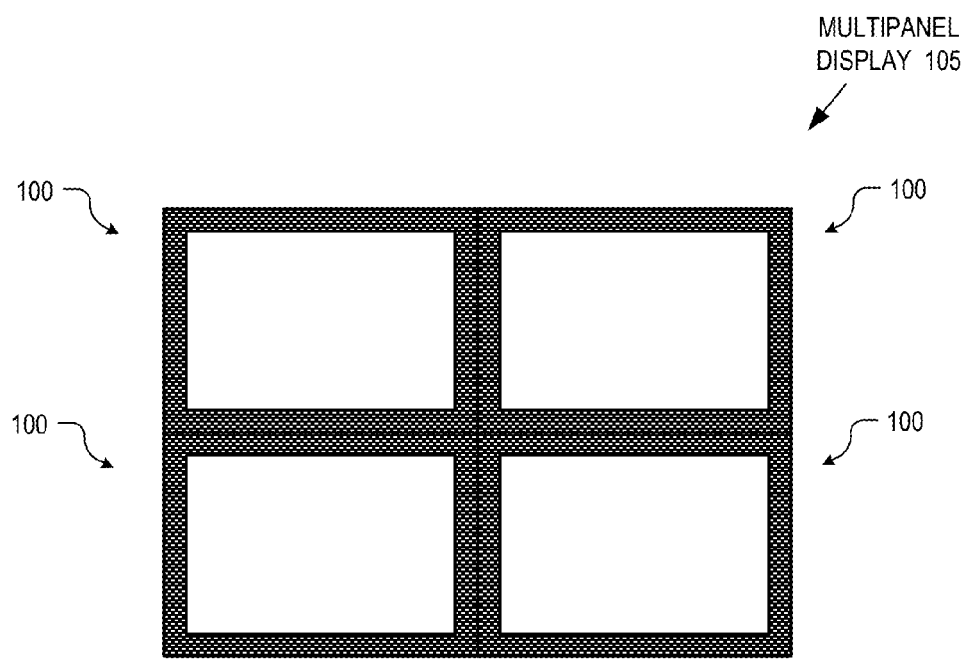
Figure 2A:
FIGS. 2A and 2B are perspective views illustrating functional layers of a tileable display panel, in accordance with an embodiment of the disclosure.
Figure 2B:
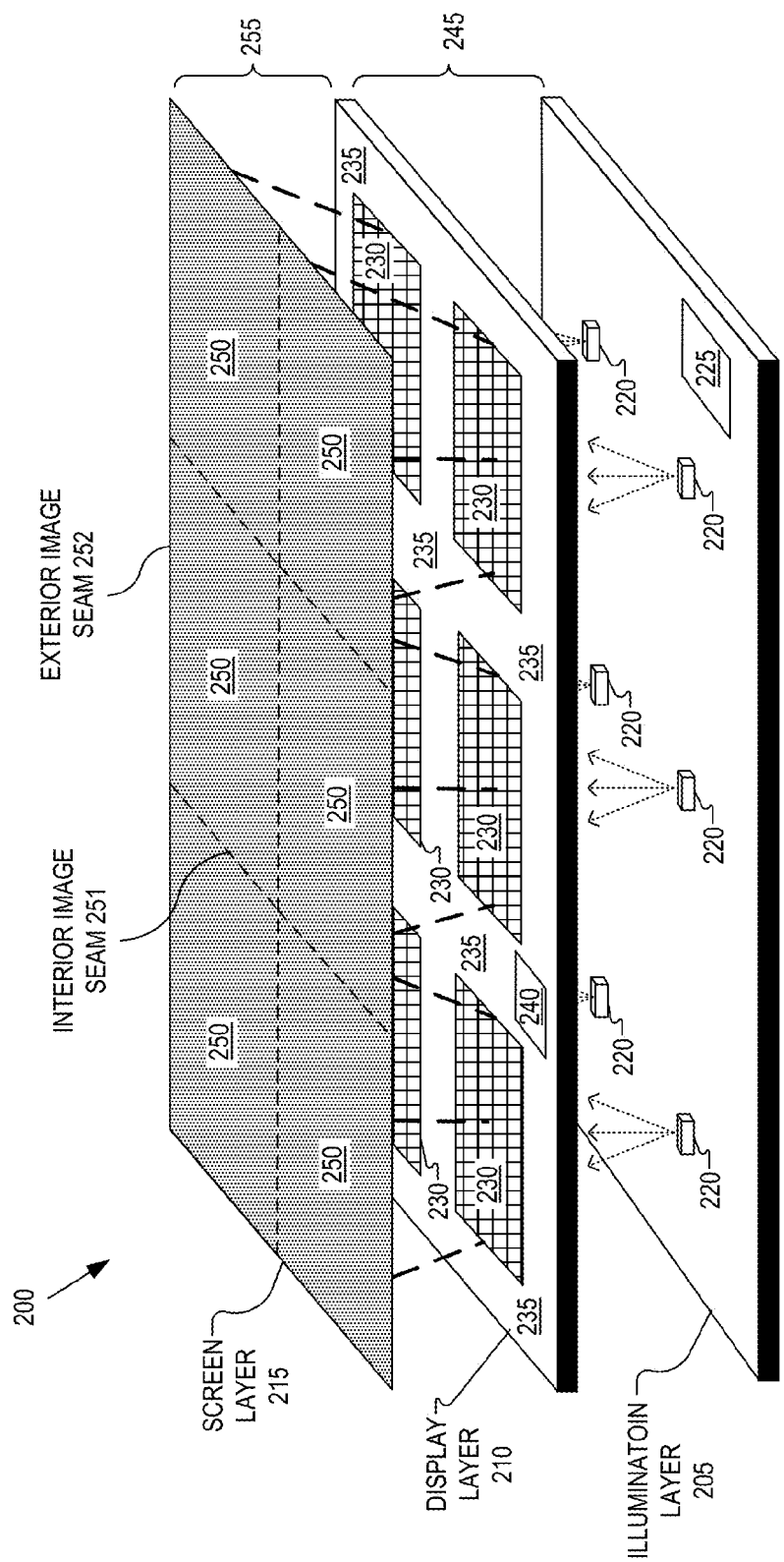

FIGS. 2A and 2B are perspective views illustrating functional layers of a tileable display panel 200, in accordance with an embodiment of the disclosure. The illustrated embodiment of tileable display panel 200 includes an illumination layer 205, a display layer 210, and a screen layer 215. Referring to FIG. 2B, the illustrated embodiment of illumination layer 205 includes an array of lamps 220 and an illumination controller 225. The illustrated embodiment of display layer 210 includes pixelets 230 separated from each other by spacing regions 235 and a display controller 240.

In the illustrated embodiment, each lamp 220 is aligned under a corresponding pixelet 230 to illuminate a backside of the corresponding pixelet with lamp light. Lamps 220 may be implemented as independent light sources (e.g., color or monochromatic LEDs, quantum dots, etc.) that emit light with a defined angular spread or cone to fully illuminate their corresponding pixelet 230 residing above on display layer 210. The illumination layer 205 and display layer 210 are separated from each other by a fixed distance 245 (e.g., 8 mm). This separation may be achieved using a transparent intermediary (e.g., glass or plastic layers) and may further include one or more optical elements (e.g., lenses, apertures, beam confiners, etc.) to control or manipulate the angular extent and cross-sectional shape of the lamp light emitted from lamps 220. In one embodiment, illumination controller 225 is coupled to lamps 220 to control their illumination intensity.

Pixelets 230 are disposed on the display layer 210 and each includes an array of transmissive pixels (e.g., 100 pixels by 100 pixels). In one embodiment, the transmissive pixels may be implemented as backlit liquid crystal pixels. Each pixelet 230 is an independent display array that is separated from adjacent pixelets 230 by spacing regions 235 on display layer 210. The internal spacing regions 235 that separate adjacent pixelets 230 from each other may be twice the width as the perimeter spacing regions 235 that separate a given pixelet 230 from an outer edge of display layer 210. In one embodiment, the internal spacing regions 235 have a width of 4 mm while the perimeter spacing regions 235 have a width of 2 mm. Of course, other dimensions may be implemented.

Although FIGS. 2A and 2B illustrate each display layer 210 as including six pixelets 230 arranged into two rows and three columns, it should be appreciated that various implementations of tileable display panel 200 may include more or less pixelets 230 organized into differing combinations of rows and columns. As such, in embodiments having a one-to-one ratio of lamps 220 to pixelets 230, the number and layout of lamps 220 on illumination layer 205 may also vary. While FIGS. 2A and 2B do not illustrate intervening layers between the three illustrated layers, it should be appreciated that embodiments may include various intervening optical and structural layers, such as lens arrays, transparent substrates to provide mechanical rigidity and optical offsets, a protective layer over screen layer 215, or otherwise.

Pixelets 230 are switched under control of display controller 240 to modulate the lamp light and project magnified image sub-portions 250 onto a backside of screen layer 215. In one embodiment, screen layer 215 is fabricated of a matte material suitable for rear projection that is coated onto a transparent substrate that provides mechanical support. Magnified image sub-portions 250 collectively blend together on screen layer 215 to present a unified image to a viewer from the viewing side of screen layer 215 that is substantially without seams. In other words, the images created by pixelets 230 are magnified as they are projected across separation 255 (e.g., 2 mm) between display layer 210 and screen layer 215. The magnified image sub-portions 250 are magnified enough to extend over and cover spacing regions 235. The magnification factor is dependent upon separation 255 and the angular spread of the lamp light emitted by lamps 220. In one embodiment, the magnified image sub-portions are magnified by a factor of approximately 1.5. Not only does the unified image cover the internal spacing regions 235, but also covers the perimeter spacing regions 235. As such, tileable display panel 200 may be positioned adjacent to other tileable display panels 200 and communicatively interlinked to form larger composite seamless displays, in which case the unified image generated by a single tileable display panel becomes a sub-portion of a multi-panel unified image.

As illustrated, pixelets 230 are spaced across display layer 210 in a matrix with spacing regions 235 separating each pixelet 230. In one embodiment, pixelets 230 each represent a separate and independent array of display pixels (e.g., backlit LCD pixels). Spacing region 235 are significantly larger than the inter-pixel separation between pixels of a given pixelet 230. Spacing regions 235 provide improved flexibility for routing signal lines or the inclusion of additional circuitry, such as display controller 240. Spacing regions 235 that reside along the exterior perimeter of display layer 210 also provide space for the bezel trim of tileable display panel 200. The bezel trim operates as the sides of the housing for tileable display panel 200. The spacing regions 235 that reside along the exterior perimeter also provide space for power and/or communication ports.

While careful control over manufacturing tolerances can provide good alignment between adjacent magnified image sub-portions 250 (intra panel seams), these seams may not be entirely invisible without significant manufacturing expense. Furthermore, the external perimeter seams between adjacent magnified image sub-portions 250 on different tileable display panels 200 are greatly susceptible to user misalignments when mounting a multi-panel display on a surface and as such may be even more visible. Accordingly, techniques described herein use overlap regions having higher image resolution on screen layer 215 to overcome manufacturing and user misalignments and blend adjacent magnified image sub-portions 250 in a manner that provides a near seamless unified image.

Figure 3A:
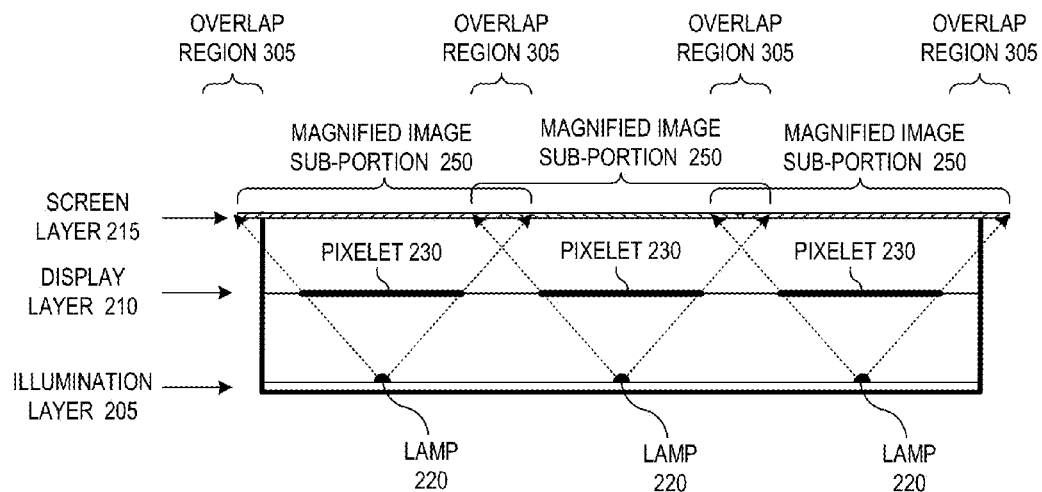
FIG. 3A is a cross-sectional view of functional layers of a tileable display panel illustrating overlap regions in a projected unified image, in accordance with an embodiment of the disclosure.

FIG. 3A is a cross-sectional view of the three functional layers of tileable display panel 200, in accordance with an embodiment of the disclosure. As illustrated, the position and beam spread of lamp 220 relative to pixelets 230 and screen layer 215 are designed such that the pixelets 230 project magnified image sub-portions 250 that overlap with those of adjacent neighbors. These overlapping areas of magnified image sub-portions 250 projected onto the backside of screen layer 215 are referred to as overlap regions 305.

Overlap regions 305 may be several pixels wide and provide a region on screen layer 215 where adjacent pixelets 230 both contribute image pixels onto screen layer 215. Since both adjacent pixelets 230 contribute image pixels into overlap regions 305, these regions have higher effective image resolution, which provides greater flexibility for blending adjacent magnified image sub-portions 250 in a near seamless manner. The overlapping image pixels and higher image resolution provides greater flexibility to seamlessly combine magnified image sub-portions 250. In one embodiment, the higher image resolution in overlap regions 305 facilitates intelligent mapping of content to selected physical pixels along both interior seams 251 and exterior seams 252. Intelligent mapping of content can be used to apply configurable alignment to adjacent magnified image sub-portions 250. Configurable alignment may include both linear and non-linear translations of the magnified image sub-portions 250. In one embodiment, image distortions (e.g., blurring) may be applied in overlap regions 305 to help conceal the appearance of seam lines. The higher image resolution permits the image distortion to be applied in a more effective manner while reducing the perception of this distortion.

Figure 3B:
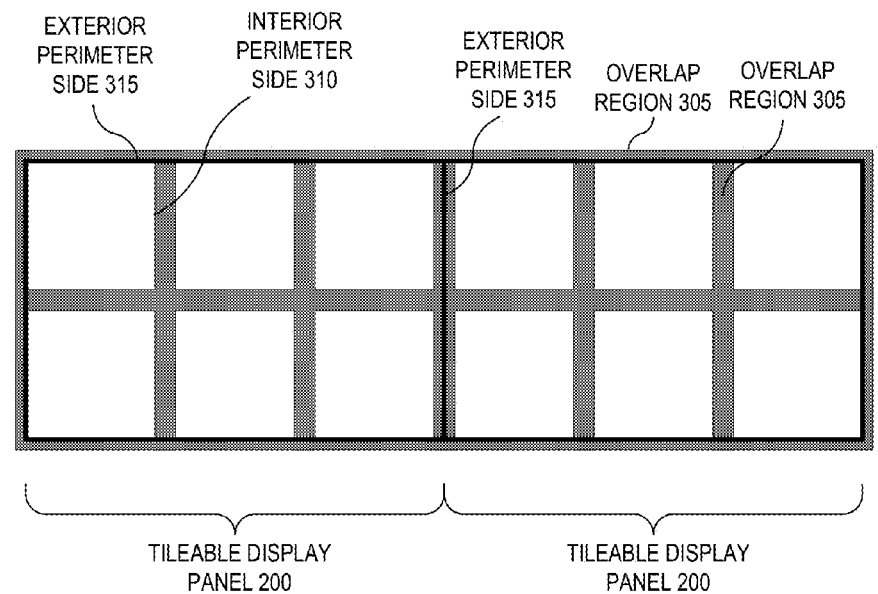
FIG. 3B is a plan view of two tileable display panels illustrating how overlap regions conceal interior and exterior seams, in accordance with an embodiment of the disclosure.

FIG. 3B is a plan view of two tileable display panels 200 illustrating how overlap regions 305 conceal interior and exterior seams, in accordance with an embodiment of the disclosure. As illustrated, magnified image sub-portions 205 overlap along both interior seams 251 (see FIG. 2B) running above interior perimeter sides 310 (see FIG. 3B) of pixelets 230 and exterior seams 252 (see FIG. 2B) running above exterior perimeter sides 315 (see FIG. 3B) of pixelets 230.

Figure 4A:
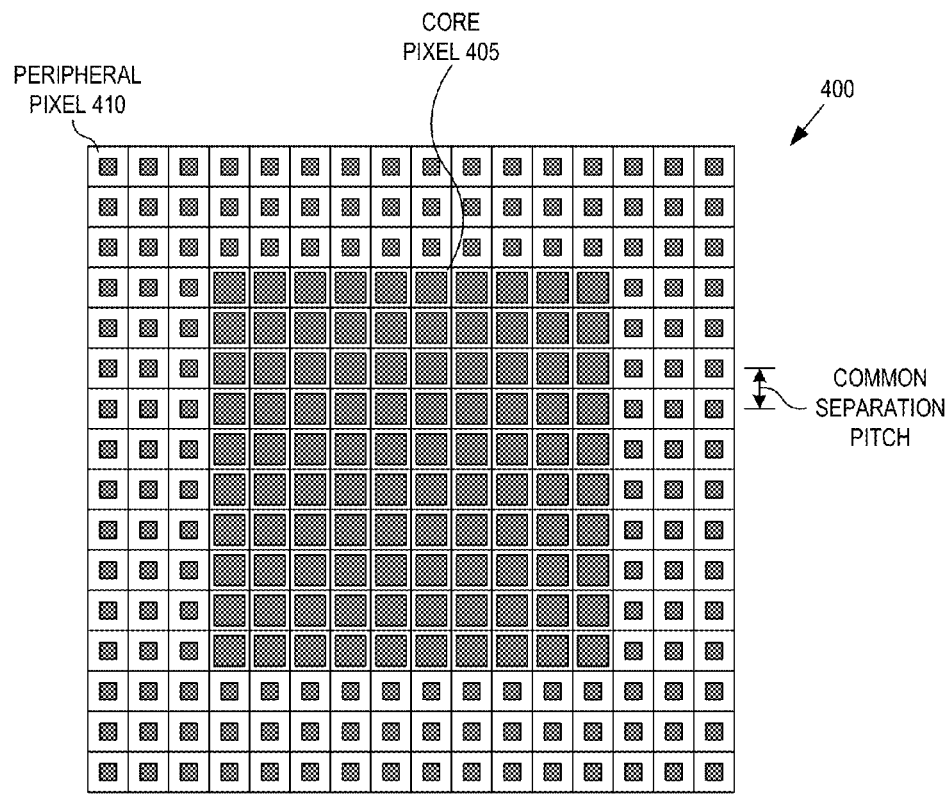
FIG. 4A is a plan view of a display layer of a tileable display panel illustrating how transmissive apertures of peripheral pixels in a pixelet are smaller than core pixels in the pixelet, in accordance with an embodiment of the disclosure.

FIG. 4A is a plan view of a pixelet on a display layer of a tileable display panel illustrating how transmissive apertures of peripheral pixels in the pixelet are smaller than core pixels, in accordance with an embodiment of the disclosure. Pixelet 400 is one possible implementation of pixelets 230 illustrated in FIG. 2B. The illustrated embodiment of pixelet 400 includes core pixels 405 and peripheral pixels 410.

Although FIG. 4A illustrates a 16×16 pixel array, in practice pixelet 400 will typically be much larger (e.g., 100×100 pixel array, 200×200 pixel array, or otherwise). Peripheral pixels 410 surround core pixels 405 on two or more sides (FIG. 4A illustrates peripheral pixels 410 surrounding on all four sides). In various embodiments, peripheral pixels 410 may typically range between three and ten pixels deep around the perimeter of pixelet 400; however, other embodiments may be implemented with the peripheral region being two pixels deep or greater than ten pixels deep.

Both core pixels 405 and peripheral pixels 410 are implemented as transmissive backlit display pixels, such as LCD pixels; however, peripheral pixels 410 are different than core pixels 405. Each pixel includes a transmissive aperture, illustrated symbolically as the greyed out portion of each pixel in FIG. 4A. The transmissive apertures are the portion of each pixel that selectively transmits or blocks light in response to a control signal for the given pixel. As illustrated in FIG. 4A, core pixels 405 and peripheral pixels 410 both share a common separation pitch, as measured center-to-center between adjacent pixels. However, the size (e.g., area) of the transmissive aperture of peripheral pixels 410 is smaller than the size of the transmissive aperture of core pixels 405. In one embodiment, the transmissive aperture size of peripheral pixels 405 is half the area of the transmissive aperture size of core pixels 410. Other size ratios may be implemented. Although not illustrated, in some embodiments, the separation pitch of peripheral pixels 410 may also be smaller than that of core pixels 405. In yet another embodiment, one or both of the transmissive aperture size and/or the separation pitch of peripheral pixels 410 may be non-uniform and gradually decrease with proximity towards the perimeter edge of pixelet 400.

Figure 4B:
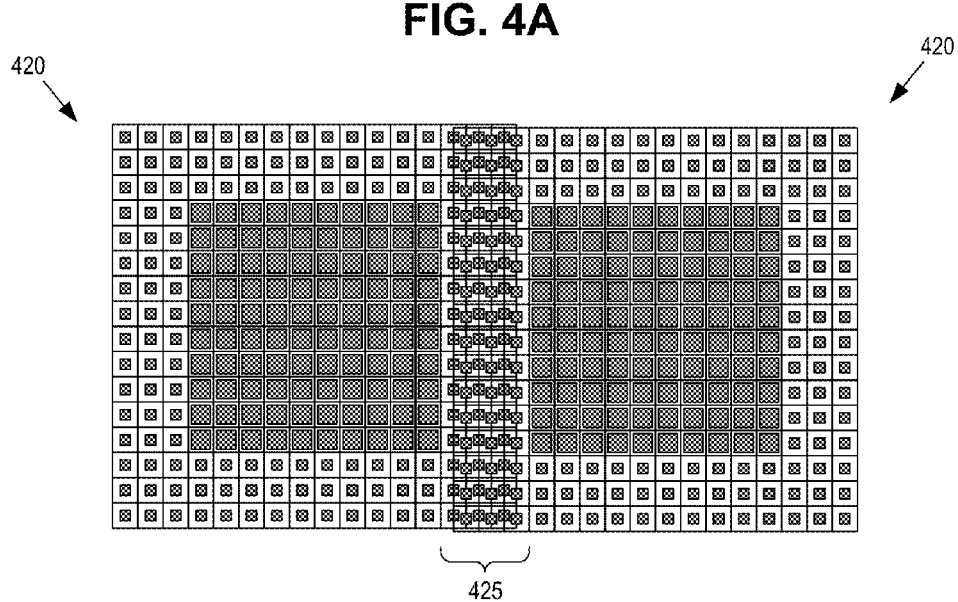
FIG. 4B illustrates how the peripheral pixels of adjacent pixelets produce pixel images on the screen layer that combine in the overlap region to increase the image resolution in the overlap region, in accordance with an embodiment of the disclosure.

FIG. 4B illustrates how the peripheral pixels of adjacent pixelets produce pixel images 420 on the screen layer that combine in overlap region 425 to increase the image resolution in overlap region 425, in accordance with an embodiment of the disclosure. As illustrated, by using appropriate alignments and offsets between adjacent pixelets on the display layer, the images projected onto the backside of the screen layer in overlap region 425 have increased image resolution. In the example of maintaining a constant separation pitch between core and peripheral pixels while halving the size of each transmissive aperture, the image resolution is doubled in overlap region 425, while the image brightness remains effectively constant since the overall ratio of transmissive to non-transmissive area in overlap region 425 to the core region remains constant. Overlap region 425 can be used to blend both intra and inter panel seams.

Figure 5A:
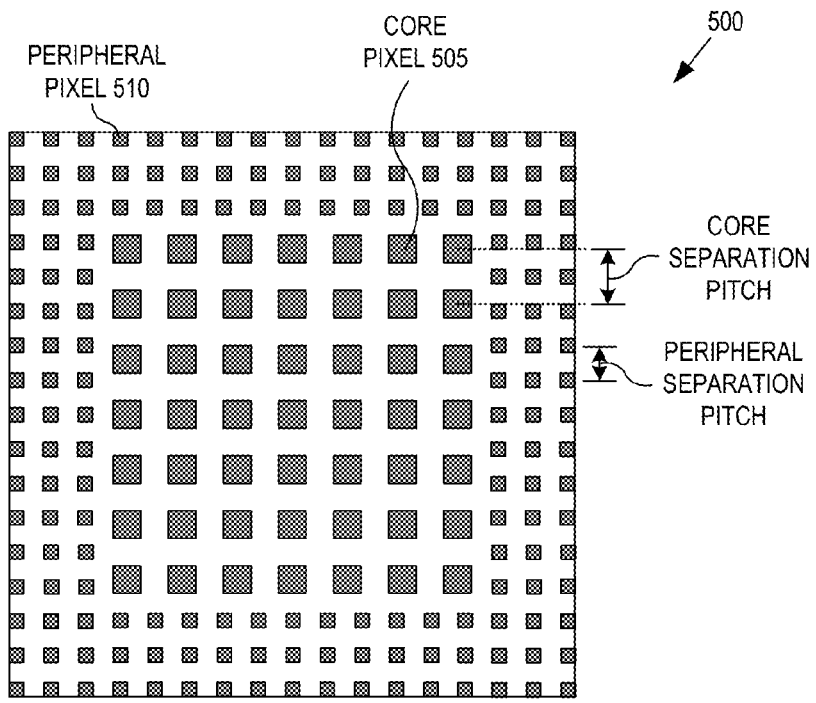
FIG. 5A is a plan view of a display layer of a tileable display panel illustrating how peripheral pixels in a pixelet are smaller with a reduced separation pitch than core pixels in the pixelet, in accordance with an embodiment of the disclosure.

FIG. 5A is a plan view of a pixelet 500 of a tileable display panel illustrating how peripheral pixels in a pixelet are smaller with a reduced separation pitch than core pixels in the pixelet, in accordance with an embodiment of the disclosure. Pixelet 500 is one possible implementation of pixelets 230 illustrated in FIG. 2B. The illustrated embodiment of pixelet 500 includes core pixels 505 and peripheral pixels 510.

Although FIG. 5A illustrates a 13×13 pixel array, in practice pixelet 500 will typically be much larger (e.g., 100×100 pixel array). Peripheral pixels 510 surround core pixels 505 on two or more sides (FIGS. 5A illustrates peripheral pixels 510 surrounding on all four sides). In various embodiments, peripheral pixels 510 may typically range between three and five pixels deep around the perimeter of pixelet 500; however, other embodiments may be implemented with the peripheral region being two pixels deep or greater than five pixels deep.

Both core pixels 505 and peripheral pixels 510 are implemented as transmissive backlit display pixels, such as LCD pixels; however, the peripheral pixels 510 are different than core pixels 505. As illustrated in FIG. 5A, peripheral pixels 510 are smaller in size and have a smaller separation pitch than core pixels 505. In one embodiment, the peripheral pixels 510 are half the size of core pixels 505 and have half the separation pitch. Of course, other size and pitch ratios may be implemented. In other embodiments (not illustrated), one or both of the pixel size and/or the separation pitch of peripheral pixels 510 may be non-uniform and gradually decrease with proximity towards the perimeter edge of pixelet 500.

Figure 5B:
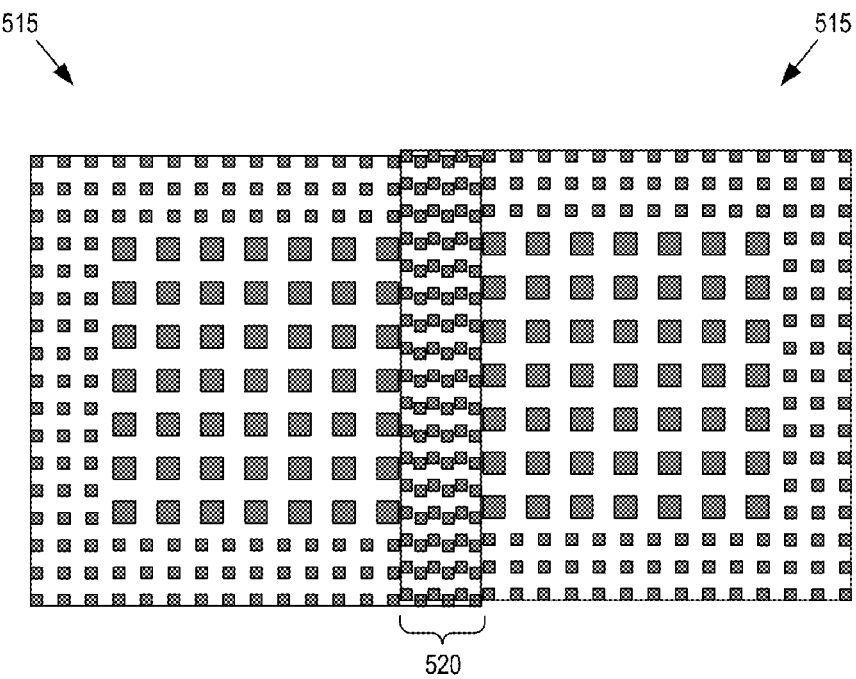
FIG. 5B illustrates how the peripheral pixels of adjacent pixelets produce pixel images on the screen layer that combine in the overlap region to increase the image resolution in the overlap region, in accordance with an embodiment of the disclosure.

FIG. 5B illustrates how the peripheral pixels of adjacent pixelets produce pixel images 515 on the screen layer that combine in overlap region 520 to increase the image resolution in overlap region 520 relative to the core pixel region, in accordance with an embodiment of the disclosure. As illustrated, by using appropriate alignments and offsets between adjacent pixelets on the display layer, the images projected onto the backside of the screen layer in overlap region 520 have increased image resolution. In the example of halving the pixel size and separation pitch for peripheral pixels 510, the image resolution may be quadrupled in overlap region 520. In one embodiment, a density of peripheral pixels 510 is selected such that the lamp light transmitted to the backside of the screen layer in overlap region 520 through peripheral pixels 510 has substantially uniform brightness to the lamp light transmitted to the back side of the screen layer in core regions of the screen layer through the core pixels 505. Overlap region 520 can be used to blend both intra and inter panel seams.

The embodiment of FIG. 5A, while providing a greater increase in image resolution relative to the embodiment of FIG. 4A, may be more expensive to fabricate than the embodiment of FIG. 4A. Accordingly, in one embodiment, both seaming techniques may be implemented together. For example, the technique of FIG. 4A (constant separation pitch with reduced transmission aperture sizes) is used along interior perimeter sides 310 to hide intra-panel seams between adjacent pixelets 230, while the technique of FIG. 5A (reduced pixel size and reduced separation pitch) is used along exterior perimeter sides 315 to hide inter-panel seams between adjacent pixelets 230 of different tileable display panels 200.

In some embodiments, pixelets 230 may be bundled into modules or groups to ease manufacturing by reducing the number of display pixels and pixelets manufactured on a monolithic substrate. For example, a demonstrative tileable display panel 200 may include a total of 400 pixelets 230 on display layer 210; however, in one embodiment, these 400 pixelets 230 may be fabricated in modules or groups of 20, with 20 such modules brought together during assembly to form a single display layer 210. As such, these modules also include interior and exterior seams, which may benefit from greater image resolution along the module exterior seams compared to the module interior seams. Accordingly, various embodiments design the peripheral pixels of different pixelets 230 on display layer 210 to provide variable increases in the image resolution in the overlap regions 305 across screen layer 215 to correct for alignment or artifacts present at the various boundaries.

Figure 6A:
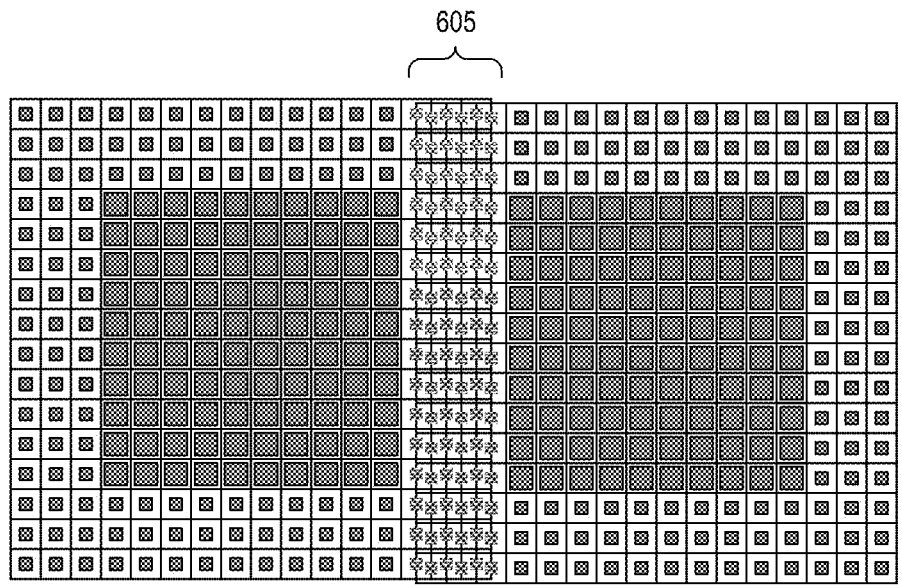
FIGS. 6A & 6B illustrate how blurring pixel images projected by peripheral pixels into the overlap regions on the screen layer reduces the perception of seams in the unified image on the screen layer, in accordance with embodiments of the disclosure.
Figure 6B:
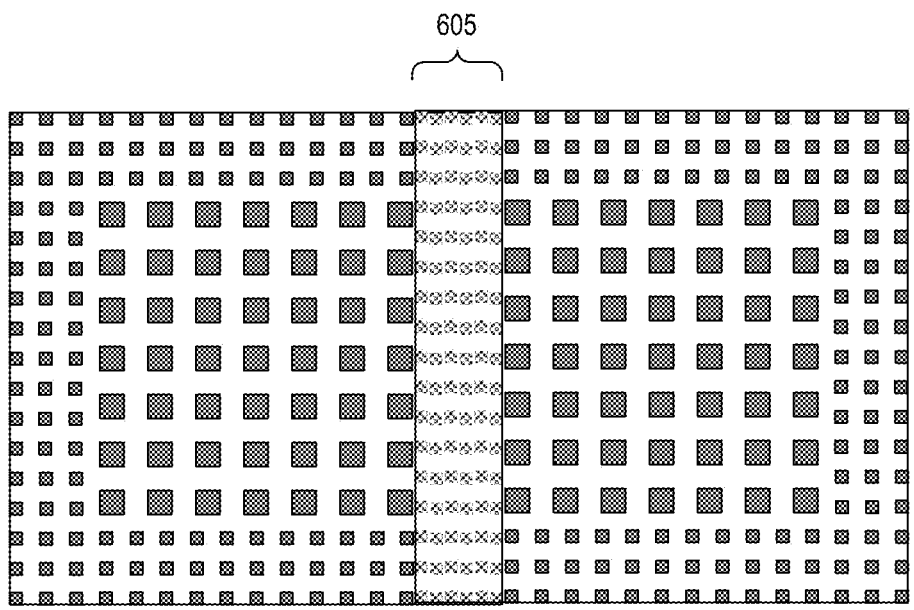

FIGS. 6A & 6B illustrate how blurring pixel images projected by peripheral pixels into the overlap regions 605 on the screen layer reduces the perception of seams in the unified image on the screen layer, in accordance with embodiments of the disclosure. As mentioned above, the overlapping of image pixels and the resultant higher image resolution provides greater flexibility to seamlessly combine magnified image sub-portions 250 using software manipulations of the images along just the seams. One such manipulation is to blur the pixels images in just overlap regions 605. Blurring the images makes regular patterns, such as a straight line seam, less noticeable to the human eye. However, the higher image resolution in overlap regions 605 make the image blurring less noticeable when compared to the image portion projected from the core pixels. Accordingly, in some embodiments, display controller 240 operates to reduce image sharpness just around the perimeters of pixelets 230 relative to the core region of pixelets 230. Other image manipulations techniques (e.g., remapping physical pixels and image content) may be implemented and the high resolution provided by the peripheral pixels in overlap regions 605 provides greater flexibility to do so, without increasing the pixel resolution of the entire display layer 210, which increases computational complexity and fabrication costs.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A tileable display panel, comprising:
 a screen layer upon which a unified image is projected from a backside;
 an illumination layer to generate lamp light; and
 a display layer disposed between the screen layer and the lamp layer, the display layer including a plurality of pixelets separated from each other by spacing regions, wherein each of the pixelets is positioned to be illuminated by the lamp light from the illumination layer and to project a magnified image sub-portion onto the backside of the screen layer such that the magnified image sub-portions collectively blend together to form the unified image which covers the spacing regions on the display layer, wherein each of the pixelets includes an array of transmissive pixels comprising:
 core pixels each having a common size and having a first separation pitch that is constant; and
 peripheral pixels surrounding the core pixels on two or more sides which provide a higher image resolution in overlap regions on the screen layer when the magnified image sub-portions projected from adjacent pixelets overlap on the screen layer.

2. The tileable display panel of claim 1, wherein each of the peripheral pixels has a transmissive aperture that is smaller in area than that of the core pixels.

3. The tileable display panel of claim 2, wherein the peripheral pixels have a constant separation pitch that is equivalent to the first separation pitch of the core pixels.

4. The tileable display panel of claim 2, wherein a size of the transmissive apertures of the peripheral pixels is selected such that the lamp light transmitted to the backside of the screen layer in the overlap regions through the peripheral pixels has substantially uniform brightness to the lamp light transmitted to the back side of the screen layer in core regions of the screen layer through the core pixels.

5. The tileable display panel of claim 1, wherein the peripheral pixels are smaller than the core pixels and have a second separation pitch that is shorter than the first separation pitch of the core pixels.

6. The tileable display panel of claim 5, wherein a density of the peripheral pixels is selected such that the lamp light transmitted to the backside of the screen layer in the overlap regions through the peripheral pixels has substantially uniform brightness to the lamp light transmitted to the back side of the screen layer in core regions of the screen layer through the core pixels.

7. The tileable display panel of claim 1, wherein the peripheral pixels extend between three to ten pixels deep around a perimeter of each of the pixelets.

8. The tileable display panel of claim 1, wherein the peripheral pixels that are adjacent to exterior perimeter sides of the tileable display panel have smaller separation pitch, transmissive aperture, or pixel size than the peripheral pixels that are adjacent to interior perimeter sides of the pixelets to provide increased blending across adjacent tileable display panels relative to adjacent pixelets within the tileable display panel.

9. The tileable display panel of claim 1, wherein the peripheral pixels of different pixelets on the display layer provide variable increases in the image resolution in the overlap regions across the screen layer.

10. The tileable display panel of claim 1, wherein the peripheral pixels that are adjacent to exterior perimeter sides of the tileable display panel have a smaller separation pitch than the core pixels while the peripheral pixels that are adjacent to interior perimeter sides of the pixelets have a smaller transmissive aperture than the core pixels.

11. The tileable display panel of claim 1, further comprising:
 a display controller coupled to the core and peripheral pixels to reduce image sharpness of the peripheral pixels relative to the core pixels to reduce the appearance of a seam in the overlap regions.

12. The tileable display panel of claim 1, wherein one or both of a separation pitch or transmissive aperture size of the peripheral pixels is non-uniform and decreases with closer proximity to a perimeter of a given pixelet.

13. A display system, comprising:
 a plurality of display panels each housed within a bezel that permits the display panels to be aligned relative to each other and communicatively coupled to collectively display a multi-panel unified image across the display panels, wherein each of the display panels includes:
 a screen layer;
 an illumination layer to generate lamp light; and
 a display layer disposed between the screen layer and the lamp layer, the display layer including a plurality of pixelets separated from each other by spacing regions, wherein each of the pixelets is positioned to be illuminated by the lamp light from the illumination layer and to project a magnified image sub-portion onto a backside of the screen layer such that the magnified image sub-portions of all the display panels collectively blend together to form the multi-panel unified image which covers the spacing regions and the bezels separating adjacent display panels, wherein each of the pixelets includes an array of transmissive pixels comprising:
 core pixels each having a common size and having a first separation pitch that is constant; and
 peripheral pixels surrounding the core pixels on two or more sides which provide a higher image resolution in overlap regions on the screen layer when the magnified image sub-portions projected from adjacent pixelets overlap on the screen layer.

14. The display system of claim 13, wherein each of the peripheral pixels has a transmissive aperture that is smaller in area than that of the core pixels.

15. The display system of claim 14, wherein the peripheral pixels have a constant separation pitch that is equivalent to the first separation pitch of the core pixels.

16. The display system of claim 14, wherein a size of the transmissive apertures of the peripheral pixels is selected such that the lamp light transmitted to the backside of the screen layer in the overlap regions through the peripheral pixels has substantially uniform brightness to the lamp light transmitted to the back side of the screen layer in core regions of the screen layer through the core pixels.

17. The display system of claim 13, wherein the peripheral pixels are smaller than the core pixels and have a second separation pitch that is shorter than the first separation pitch of the core pixels.

18. The display system of claim 17, wherein a density of the peripheral pixels is selected such that the lamp light transmitted to the backside of the screen layer in the overlap regions through the peripheral pixels of adjacent pixelets has substantially uniform brightness to the lamp light transmitted to the back side of the screen layer in core regions of the screen layer through the core pixels.

19. The display system of claim 13, wherein the peripheral pixels that are adjacent to exterior perimeter sides of a given display panel have a smaller separation pitch than the core pixels while the peripheral pixels that are adjacent to interior perimeter sides of the pixelets have a smaller transmissive aperture than the core pixels.

20. The display system of claim 13, further comprising:
a display controller coupled to the core and peripheral pixels to reduce image sharpness of the peripheral pixels relative to the core pixels to reduce the appearance of a seam in the overlap regions.

\* \* \* \* \*